(12) United States Patent
Nakagawa et al.

(10) Patent No.: US 11,149,773 B2
(45) Date of Patent: *Oct. 19, 2021

(54) CONNECTION FASTENER

(71) Applicant: MAX CO., LTD., Tokyo (JP)

(72) Inventors: Yasushi Nakagawa, Tokyo (JP); Toshimichi Arai, Tokyo (JP)

(73) Assignee: MAX CO., LTD., Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 16/446,921

(22) Filed: Jun. 20, 2019

(65) Prior Publication Data

US 2019/0301512 A1 Oct. 3, 2019

Related U.S. Application Data

(63) Continuation of application No. 15/648,818, filed on Jul. 13, 2017, now Pat. No. 10,428,853.

(30) Foreign Application Priority Data

Jul. 15, 2016 (JP) .................................. 2016-139922
May 16, 2017 (JP) .................................. 2017-096995

(51) Int. Cl.
*F16B 27/00* (2006.01)
*F16B 15/08* (2006.01)
*B25C 1/00* (2006.01)

(52) U.S. Cl.
CPC .............. *F16B 15/08* (2013.01); *B25C 1/003* (2013.01); *F16B 27/00* (2013.01)

(58) Field of Classification Search
CPC ...... F16B 15/08; F16B 19/14; F16B 15/0092; F16B 27/00; B25C 1/003

(Continued)

(56) References Cited

U.S. PATENT DOCUMENTS 2,203,294 A  6/1940  Engle
3,841,474 A  10/1974  Maier
(Continued)

FOREIGN PATENT DOCUMENTS

CN  101978178 A  2/2011
EP  2258954 A1  12/2010
(Continued)

OTHER PUBLICATIONS

Office Action for JP Application No. 2017-096995 dated Feb. 16, 2021 (3 pages).

*Primary Examiner* — Flemming Saether
(74) *Attorney, Agent, or Firm* — Rothwell, Figg, Ernst & Manbeck, P.C.

(57) ABSTRACT

A connection fastener includes a plurality of fasteners, a sheet-shaped connection portion and attaching portions. Each fastener includes a head portion provided at one end portion side and a tapered leading end portion provided at the other end portion side. The sheet-shaped connection portion is configured to connect the plurality of fasteners in a parallel direction. The attaching portions are separate from the connection portion attached to the fasteners such that each attaching portion covers at least one part of each leading end portion. The connection portion includes first holding portions and second holding portions. Each of the first holding portions is configured to support a head portion side of each fastener. Each of the second holding portions is configured to support at least one part of a circumferential surface of each attaching portion.

17 Claims, 11 Drawing Sheets

(58) Field of Classification Search
USPC .................................. 411/440–444
See application file for complete search history.

(56) References Cited

U.S. PATENT DOCUMENTS

| | | | |
|---|---|---|---|
| 4,349,106 A * | 9/1982 | Bogel | F16B 27/00 |
| | | | 206/347 |
| 4,560,061 A | 12/1985 | Haytayan | |
| 4,606,455 A | 8/1986 | Grikis et al. | |
| 4,915,561 A | 4/1990 | Bubri et al. | |
| 5,178,903 A | 1/1993 | Lat et al. | |
| 5,452,796 A | 9/1995 | Ohuchi | |
| 6,436,474 B2 | 8/2002 | Godsted et al. | |
| 6,779,959 B1 | 8/2004 | Yang | |
| 7,273,337 B2 | 9/2007 | Lat et al. | |
| 7,963,393 B2 | 6/2011 | Nakagawa et al. | |
| 2003/0082025 A1* | 5/2003 | Luhm | F16B 13/04 |
| | | | 411/43 |
| 2010/0329818 A1 | 12/2010 | Yamamoto et al. | |
| 2012/0298716 A1 | 11/2012 | Segura | |
| 2013/0270135 A1 | 10/2013 | Huang | |

FOREIGN PATENT DOCUMENTS

| | | |
|---|---|---|
| JP | 03-96417 U | 10/1991 |
| JP | 2002-081424 A | 3/2002 |
| JP | 3135031 U | 8/2007 |

* cited by examiner

CONNECTION FASTENER

CROSS-REFERENCE TO RELATED APPLICATIONS

This application is a continuation of U.S. application Ser. No. 15/648,818, filed Jul. 13, 2017, which claims priority to Japanese Patent Application Nos. 2016-139922 filed on Jul. 15, 2016 and 2017-096995 filed on May 16, 2017, the disclosures of which are incorporated herein in their entirety by reference, and priority is claimed to each of the foregoing.

TECHNICAL FIELD

The present invention relates to a connection fastener used for a driving tool.

BACKGROUND

Since a connection fastener for connecting a plurality of fasteners with a connection band can set a great deal of fasteners to a driving tool en bloc and continuously inject the great deal of fasteners, the connection fastener is used in various driving tools. The connection band of this connection fastener holds the fastener in two upper and lower places as described in, for instance, JP-U-A-H03-96417, and thereby can stably hold the fastener.

SUMMARY

Among the driving tools mentioned above, one capable of using a plurality of types of fasteners having different lengths is present. A connection fastener used for this driving tool uses a connection band according to specifications of the tool, and thereby enables use for the same tool even when the connection fasteners have different lengths. In other words, a shape or the like of the connection band is designated by the specifications of the tool, and cannot be freely changed. For example, a vertical width (a distance between a lower holding portion and an upper holding portion) of the connection band is designated by a width capable of corresponding to a feed motion of the connection fastener of the tool and a discharge motion of the connection band, and cannot be freely changed.

For this reason, when a fastener in which a length of a shank (a straight portion between a head portion and a tapered leading end portion of the fastener or a straight portion between an under-head tapered portion and the tapered leading end portion. The straight portion may be gently tapered) of the fastener is shorter than a vertical width of the connection band is to be used, there is a problem that the shank of the fastener cannot be held in two upper and lower places by the connection band and the fastener is not stably held. When the connection band cannot stably hold the fastener, this causes an obstacle that the fastener driven in an oblique state is buckled or that the connection band removed and spread from the fastener is pulled into a machine so that the feed motion of the connection fastener is not smoothly performed. Under these circumstances, the fastener that cannot be held by the connection band regulated by the tool in the related art cannot be used, and restrictions are placed on a length of the fastener that can be used by a tool.

An object of the present invention is to provide a connection fastener capable of stably supporting short fasteners even when a width of a connection band (a connection portion) is regulated by a tool, and thereby using the short fasteners without changing specifications of the tool.

The present invention was made to solve the above problem, and is characterized by the following.

(1) A connection fastener includes:
   a plurality of fasteners each of which includes a head portion provided at one end portion side and a tapered leading end portion provided at the other end portion side;
   a sheet-shaped connection portion that is configured to connect the plurality of fasteners in a parallel direction; and
   attaching portions that are separate from the connection portion attached to the fasteners such that each attaching portion covers at least one part of each leading end portion,
      wherein the connection portion includes:
      first holding portions each of which is configured to support a head portion side of each fastener; and
      second holding portions each of which is configured to support at least one part of a circumferential surface of each attaching portion.

(2) The connection fastener according to (1), wherein:
   the connection portion includes second holding holes which support the attaching portions provided at the second holding portions, and first holding holes which support the head portion sides of the fasteners provided at the first holding portions; and
   diameters of the second holding holes are larger than diameters of the first holding holes.

(3) The connection fastener according to (1) or (2), wherein:
   the connection portion includes second holding holes which support the attaching portions provided at the second holding portions, and first holding holes which support the head portion sides of the fasteners provided at the first holding portions; and
   opening widths of opening slits of the second holding holes are larger than opening widths of opening slits of the first holding holes.

(4) The connection fastener according to any one of (1) to (3), wherein:
   each of the fasteners includes a shank continuously provided between the head portion and the leading end portion; and
   the second holding portions support the attaching portions at positions at which the second holding portions overlap the tapered leading end portions of the fasteners or at positions at which the second holding portions do not overlap the fasteners, when viewed from a side direction of the fastener.

(5) The connection fastener according to any one of (1) to (4), wherein:
   the connection portion is formed by bending one long sheet in a C shape;
      the first holding portions, the second holding portions, and a band-shaped portion connecting the first holding portions and the second holding portions are formed on the same plane in the long sheet;
      each of the fasteners includes a shank continuously provided between the head portion and the leading end portion; and
      in an axial direction of the fastener, a length of the shank is shorter than a length of the band-shaped portion.

(6) The connection fastener according to (5), wherein:
   each fastener includes a stepped portion at the shank; and
   the stepped portion is formed such that an outer diameter of a leading end portion side is smaller than an outer diameter of the head portion side, and faces an upper edge portion of the attaching portion.

(7) The connection fastener according to any one of (1) to (6), wherein each of the attaching portions includes a flange portion protruding in an outer circumferential direction below the second holding portion.

(8) The connection fastener according to any one of (1) to (7), wherein each of the attaching portions includes a fall-preventing shape for preventing the second holding portion from falling off.

(9) The connection fastener according to (8), wherein the fall-preventing shape is a tapered shape which diameter is gradually increased toward a leading end portion side of the fastener.

(10) The connection fastener according to (8), wherein the fall-preventing shape is a stepped shape formed by making a large diameter of the attaching portion in a leading end portion side of the fastener or a concave shape of a circumferential groove shape.

(11) The connection fastener according to (8), wherein the fall-preventing shape is a bulgy shape in which the attaching portion in the head side of the fastener is swollen in an outer circumferential direction or a large diameter shape formed by making a large diameter of the attaching portion in the head side of the fastener.

According to the first aspect of the invention, the connection fastener includes: a plurality of fasteners each of which includes a head portion provided at one end portion side and a tapered leading end portion provided at the other end portion side; a sheet-shaped connection portion that is configured to connect the plurality of fasteners in a parallel direction; and attaching portions that are separate from the connection portion attached to the fasteners such that each attaching portion covers at least one part of each leading end portion. The connection portion includes: first holding portions each of which is configured to support ahead portion side of each fastener; and second holding portions each of which is configured to support at least one part of a circumferential surface of each attaching portion. According to this configuration, since the fasteners are stretched by the attaching portions and can be held by the second holding portions, even when a width of the connection portion is regulated by a tool, the fasteners can be stably supported regardless of lengths of the fasteners.

Since the attaching portions are members which are separate from and are independent of the connection portion, the attaching portions are not pulled and inclined by the connection portion when removed from the connection portion. Therefore, the fasteners can be prevented from being inclined and buckled. No energy is lost to cut the connection portion.

The attaching portion that is more easily stabilized in dimensional precision than the fastener formed of a metal is used. Thereby, dimensions of the attaching portions and dimensions of the second holding portions can be made compatible with each other, and a holding force of the fastener held via the attaching portion by the second holding portion can be enhanced.

The attaching portion is attached to the fastener, and thereby a diameter of the toe side (the leading end portion side) of the fastener is increased. For this reason, the fastener is prevented from falling within an injection path during driving. Therefore, it is possible to stabilize a driving posture of the fastener to prevent buckling.

According to the second aspect of the invention, the diameter of the second holding hole holding the attaching portion provided at the second holding portion is larger than that of the first holding hole holding the head portion side of the fastener provided at the first holding portion. According to this configuration, the shank of the fastener is held by the first holding hole having a relatively small diameter, and the attaching portion is held by the second holding hole having a relatively large diameter. Thus, the fastener can be tightly held even at the second portion thickened by the amount of attaching the attaching portion.

According to the third aspect of the invention, the opening width of the opening slit (opening edge) of the second holding hole that supports and holds the attaching portion provided at the second holding portion is larger than that of the opening slit (opening edge) of the first holding hole that supports and holds the head portion side of the fastener provided at the first holding portion. According to this configuration, when the fastener is loaded on the connection portion, the shank of the fastener is loaded and held by the first holding hole whose opening slit (opening edge) has a relatively small opening width, and the attaching portion is loaded and held by the second holding hole whose opening slit (opening edge) has a relatively large opening width. Thus, the fastener can be loaded and held even at the lower portion thickened by the amount of attaching the attaching portion without difficulty, and assemblability is good. Even when the fastener is driven, the opening width of the opening slit (opening edge) of the second holding hole is large, and thus the fastener can be smoothly removed from the connection portion.

According to the fourth aspect of the invention, the fastener includes the shank provided between the head portion and the leading end portion, and the second holding portion supports and holds the attaching portion at the position at which the second holding portion overlaps the tapered leading end portion of the fastener or at the position at which the second holding portion does not overlap the fastener. According to this configuration, even in the short fastener located at the position at which the second holding portion overlaps the leading end portion of the fastener or at the position at which the second holding portion does not overlap the fastener, this short fastener is stretched by the attaching portion, and is held by the second holding portion. Thus, the short fastener limited by specifications of the tool so far can be used. Since even the short fastener is stably held, and since the driving posture of the fastener is stable, the buckling during driving can be prevented.

According to the fifth aspect of the invention, when viewed in the axial direction of the fastener, the length of the shank is shorter than that of the band-shaped portion. According to this configuration, even in the short fastener in which the length of the shank is shorter than that of the band-shaped portion, this short fastener is stretched by the attaching portion, and is held by the second holding portion. Thus, upper and lower portions of the shank of the fastener can be reliably held.

According to the sixth aspect of the invention, the fastener includes the stepped portion at the shank. The stepped portion is formed such that the outer diameter of the leading end portion side is smaller than that of the head side, and faces the upper edge portion of the attaching portion. According to this configuration, when the attaching portion is attached to the fastener, the position of the attaching portion depends on the stepped portion, and thus a problem that the attached position of the attaching portion to the fastener is made too shallow or too deep can be avoided.

According to the seventh aspect of the invention, the attaching portion includes the flange portion protruding below the second holding portion in the outer circumferential direction. According to this configuration, since the second holding portion is prevented from falling off by the flange portion, the second holding portion is prevented from being removed from the attaching portion.

The flange portion is provided, and thereby the diameter of the toe side of the fastener is increased. Thus, an effect of preventing the fastener from falling within the injection path during driving can be enhanced. Therefore, it is possible to stabilize the driving posture of the fastener to prevent the buckling.

According to the eighth aspect of the invention, the attaching portion includes the fall-preventing shape for preventing the second holding portion from falling off. According to this configuration, since the second holding portion is prevented from falling off by the fall-preventing shape, the second holding portion is prevented from being removed from the attaching portion.

When the fall-preventing shape is provided for the fastener, there is a problem that penetration resistance of the fastener is increased or that the fastener is easily buckled. However, the fall-preventing shape is provided for the attaching portion, and thereby such a problem does not occur.

BRIEF DESCRIPTION OF THE DRAWINGS

FIGS. 5A and 5B are views illustrating postures during driving; wherein FIG. 5A is a view when the tubular member is present and FIG. 5B is a view when the tubular member is not present;

FIGS. 6A to 6D are views illustrating postures during driving according to the present embodiment; wherein FIG. 6A is a view before a fastener comes into contact with a driver, FIG. 6B is a view just after the fastener comes into contact with the driver, FIG. 6C is a view of a state in which the tubular member is removed from the connection band, and FIG. 6D is a view of a state in which the fastener is severed from the connection band;

FIGS. 7A and 7C are views illustrating postures during driving when the tubular member is formed integrally with the connection band; wherein FIG. 7A is a view before the fastener comes into contact with a driver, FIG. 7B is a view just after the fastener comes into contact with the driver, and FIG. 7C is a view of a state in which the tubular member is severed from the connection band;

FIGS. 8A and 8B are views according to a modification; wherein FIG. 8A is a partial sectional view of the connection fastener in which a short fastener is used and FIG. 8B is a partial sectional view of the connection fastener in which the connection band is pressed by a flange portion;

FIGS. 9A and 9B are views according to a modification; wherein FIG. 9A is a partial sectional view of the connection fastener in which a nail is used and FIG. 9B is a partial sectional view of the connection fastener in which a screw is used;

FIGS. 10A to 10C are views according to a modification in which the tubular member without a flange portion is used; wherein FIG. 10A is a partial sectional view of the connection fastener in which a short fastener is used, FIG. 10B is a partial sectional view of the connection fastener in which a fastener having a medium length is used, and FIG. 10C is a partial sectional view of the connection fastener in which a long fastener is used;

FIGS. 11A to 11E are views according to a modification; wherein FIG. 11A is a partial sectional view of the connection fastener having an fall-preventing shape of a tapered shape, FIG. 11B is a partial sectional view of the connection fastener having an fall-preventing shape of a stepped shape, FIG. 11C is a partial sectional view of the connection fastener having an fall-preventing shape of a concave shape, FIG. 11D is a partial sectional view of the connection fastener having an fall-preventing shape of a bulgy shape, and FIG. 11E is a partial sectional view of the connection fastener having an fall-preventing shape of a large diameter shape; and FIGS. 12A and 12B are views according to a modification; wherein FIG. 12A is a side view of the connection fastener in which a stepped portion is provided for the tubular member, and FIG. 12B is a partial sectional view of the connection fastener in which the stepped portion is provided for the tubular member.

DETAILED DESCRIPTION

A connection fastener 10 according to the present embodiment will be described with reference to the drawings.

Figure 1:
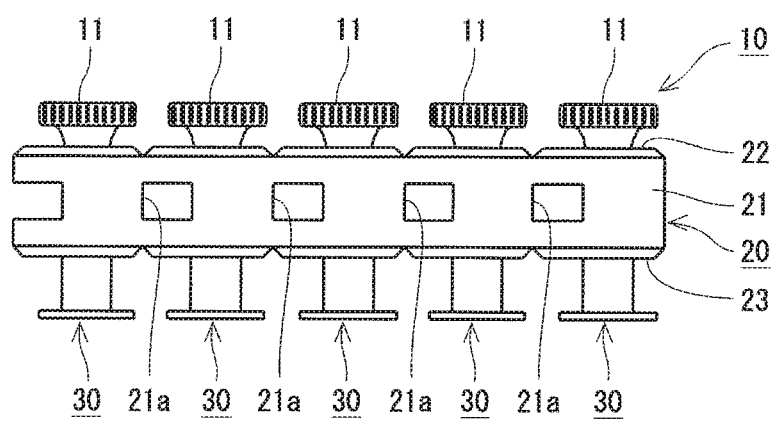
FIG. 1 is a side view of a connection fastener.

As illustrated in FIG. 1, the connection fastener 10 according to the present embodiment is configured to connect a plurality of fasteners 11 with a connection band (a connection portion) 20, so that a great deal of fasteners 11 can be set for a driving tool en bloc and be continuously injected. Although particularly not illustrated, the driving tool is provided with a magazine for containing the connection fastener 10, and a feed mechanism for feeding the connection fastener 10 stored in the magazine to a leading end portion of a tool main body thereof. The feed mechanism is linked to a driving motion and feeds the connection fastener 10 one by one, thereby setting the fastener 11 in the forefront of the connection fastener 10 for an injection path 40 provided at the leading end portion of the tool main body. The fastener 11 set for the injection path 40 in this way is driven out by a driver 41 operated by a striking mechanism of the driving tool. The fastener 11 driven out by the driver 41 passes through the injection path 40 and is injected from an injection port provided at the leading end portion of the tool main body.

The connection fastener 10 according to the present embodiment arranges and connects the fasteners 11 in parallel (in a parallel direction) such that a line connecting the centers of the fasteners 11 becomes a straight line. Thereby, the connection fastener 10 is formed in a straight band shape.

Figure 2A:
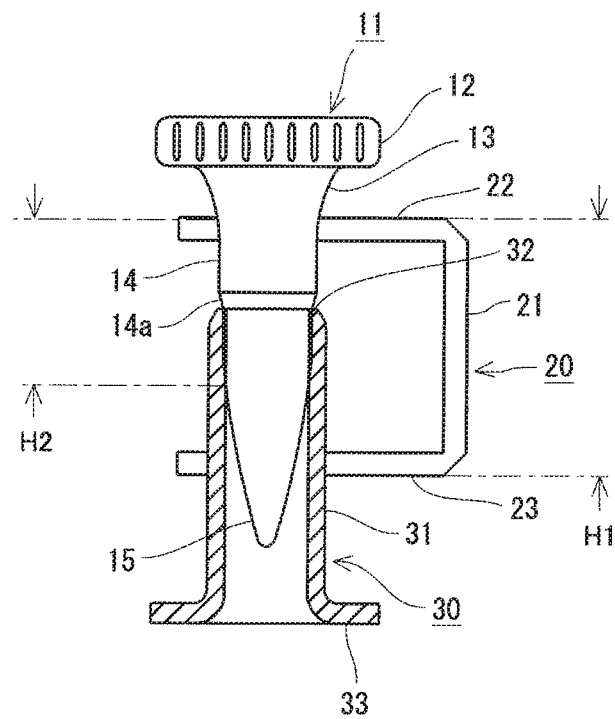
FIG. 2A is a partial sectional view of the connection fastener.

The fastener 11 according to the present embodiment is a concrete pin that is driven into, for instance, concrete or a siding member, and is, as illustrated in FIG. 2A, provided with a head portion 12, an under-head tapered portion 13 that is continuous to the head portion 12, a shank 14 that is continuous to the under-head tapered portion 13, and a tapered leading end portion 15 that is continuous to the shank 14. The head portion 12 is a discoid region being subject to the driving of the driver 41. The under-head tapered portion 13 is for smoothly connecting the head portion 12 and the shank 14, and is a region whose diameter is gradually reduced in a direction from the head portion 12 to the shank 14. The shank 14 is a region that is formed in a columnar shape and generates pullout resistance when driven into a driven material. The leading end portion 15 is a region that is formed in a pointed shape and is pierced into a driven material. In the present embodiment, the leading end portion 15 is formed in a shell shape.

The fastener 11 may have a shape with a head portion, a shank of a gently tapered shape that is continuous to the head portion (wherein an under-head tapered portion that is continuous to the head portion may be present between the head portion and the shank), and a tapered leading end portion that is continuous to the shank.

A stepped portion 14a for reducing penetration resistance is continuously formed at the shank 14 of the fastener 11 according to the present embodiment. For this reason, a diameter of the shank 14 is configured such that, in comparison with a diameter of a straight portion closer to the head portion 12 than the stepped portion 14a, a diameter of a straight portion closer to the leading end portion 15 than the stepped portion 14a is smaller.

Figure 4A:
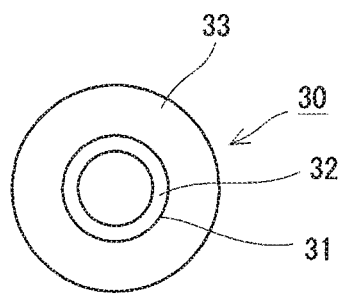
FIG. 4A is a top view of a tubular member (an attaching portion)
Figure 4B:
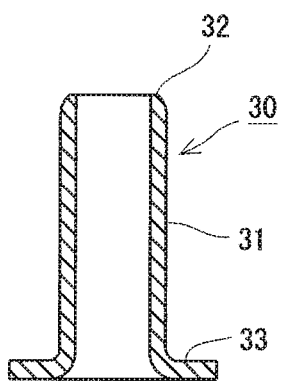
FIG. 4B is a sectional view of the tubular member (the attaching portion)

A cylindrical member 30 acting as a tubular member (an attaching portion) is attached to the shank 14 of the fastener 11. The cylindrical member 30 is a member formed of aluminum or a synthetic resin and, as illustrated in FIGS. 4A and 4B, includes a tubular portion 31 and a flange portion 33 formed to protrude from an opening edge of the tubular portion 31.

The flange portion 33 may protrude below a lower holding portion 23 in an outer circumferential direction or be provided at a position other than the opening edge. For example, the flange portion 33 may be formed on an outer circumferential surface of the tubular portion 31 to protrude in a radial direction.

In addition, the flange portion 33 may be formed separately from and independently of the tubular portion 31. A shape of the flange portion 33 is not limited to a circular shape as shown in FIG. 4A, but it may be a shape in which an outer circumference is on a cylindrical locus. For example, the shape of the flange portion 33 may be a polygonal shape or a rectangular shape having a cutout portion. Similarly, a shape of the cylindrical member 30 is not also limited to a circular shape, but it may be a tubular shape in which an inner circumference is on a cylindrical locus. For example, the cylindrical member 30 may be a tubular member having a polygonal shape or a rectangular shape which forms a cutout portion such that the tubular member covers at least one part of the shank 14.

An inner diameter of the tubular portion 31 is formed in such a size as to be able to forcibly insert the shank 14 of the fastener 11 (which is closer to the leading end portion 15 than the stepped portion 14a). The leading end portion 15 of the fastener 11 is inserted into the tubular portion 31, and thereby the cylindrical member 30 can be attached to the fastener 11. In the present embodiment, as illustrated in FIG. 2A, the fastener 11 can be inserted up to a position where the stepped portion 14a reaches an upper edge portion 32 of the cylindrical member 30, and an inserted position of the cylindrical member 30 into the fastener 11 is configured to be determined by the stepped portion 14a, so that assemblability is good.

Figure 3A:
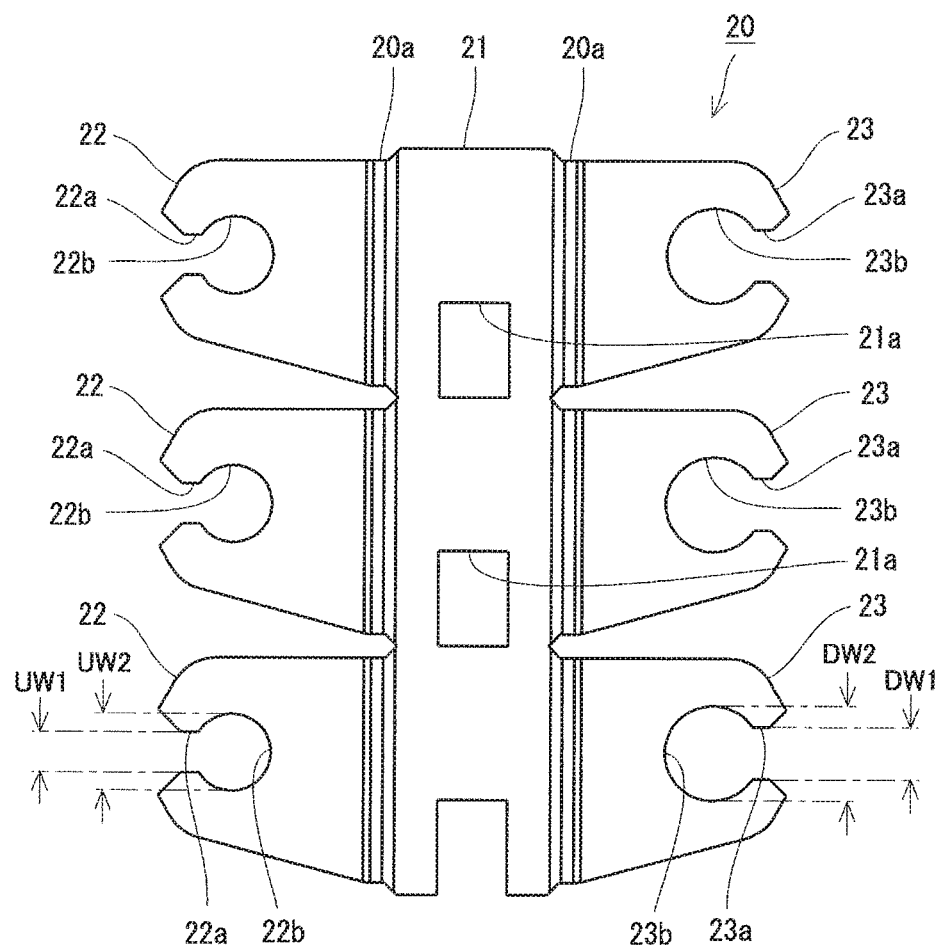
FIG. 3A is a development view of a connection band (a connection portion)
Figure 3B:
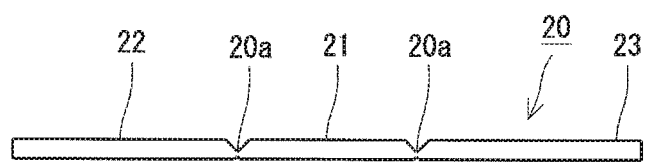
FIG. 3B is a side view of the connection band (the connection portion)

The connection band 20 connecting the fasteners 11 is a sheet-shaped member as shown in FIGS. 3A and 3B, and is formed of a synthetic resin in the present embodiment. Although it is shown in the figure that the connection band 20 is short in length, the connection band 20 is actually formed from one long sheet in which the same shape is continuous in a vertical direction of FIG. 3A.

This connection band 20 is provided with upper holding portions (first holding portions) 22, each of which holds the head portion 12 side of the fastener 11, lower holding portions (second holding portions) 23, each of which supports and holds the cylindrical member 30 attached to the fastener 11, and a band-shaped portion 21 that connects the upper holding portions 22 and the lower holding portions 23. The upper holding portions 22 and the lower holding portions 23 are provided by the same number to be correspond to each other, and one fastener 11 is configured to be held by a pair of corresponding upper and lower holding portions 22 and 23. The band-shaped portion 21 runs in a longitudinal direction to connect all of the upper and lower holding portions 22 and 23.

In this connection band 20, the upper holding portions 22, the lower holding portions 23, and the band-shaped portion 21 are formed on the same plane, and a folding groove 20a is formed between the upper holding portions 22 and the band-shaped portion 21 and between the lower holding portions 23 and the band-shaped portion 21. The connection band 20 is folded along the folding groove 20a. Thereby, as illustrated in FIG. 2A, the connection band 20 formed from one long sheet is deformed in a C shape to support and hold the fasteners 11.

As illustrated in FIG. 2A, the upper holding portion 22 supports and holds the top of the shank 14 of the fastener 11. As illustrated in FIG. 3A, the upper holding portion 22 is provided with an upper slit 22a whose width is narrower than a maximum diameter of the shank 14 of the fastener 11, and an upper holding hole (a first holding hole) 22b that is provided behind the upper slit 22a. A diameter of the upper holding hole 22b is greater than the maximum diameter of the shank 14 of the fastener 11. The upper slit 22a is provided as an opening edge of the upper holding hole 22b, and communicates with the upper holding hole 22b.

As illustrated in FIG. 2A, the lower holding portion 23 supports and holds the tubular portion 31 of the cylindrical member 30. Additionally, the lower holding portion 23 may be configured to support and hold at least one part of a circumferential surface of the cylindrical member 30. As illustrated in FIG. 3A, the lower holding portion 23 is provided with a lower slit 23a whose width is narrower than a diameter of the tubular portion 31 of the cylindrical member 30, and a lower holding hole (a second holding hole) 23b that is provided behind the lower slit 23a. A diameter of the lower holding hole 23b is greater than the diameter of the tubular portion 31 of the cylindrical member 30. The lower slit 23a is provided as an opening edge of the lower holding hole 23b, and communicates with the lower holding hole 23b.

At this time, the width DW1 of the lower slit 23a (an opening width of the opening slit (opening edge) of the lower holding hole 23b) is formed to be greater than the width UW1 of the upper slit 22a (an opening width of the opening slit (opening edge) of the upper holding hole 22b), and a diameter DW2 of the lower holding hole 23b is formed to be greater than a diameter UW2 of the upper holding hole 22b.

With this formation, an inner diameter of the lower holding hole 23b is increased depending on a lower portion of the fastener 11 which is thickened by the amount of attaching the cylindrical member 30, and the fastener 11 can be stably held.

When the fastener 11 is loaded on the connection band 20, the shank 14 of the fastener 11 is loaded from the upper slit 22a to the upper holding hole 22b, and the cylindrical member 30 is loaded from the lower slit 23a to the lower holding hole 23b. At this time, since the width DW1 of the lower slit 23a is increased depending on the lower portion of the fastener 11 which is thickened by the amount of attaching the cylindrical member 30, the fastener 11 can be loaded and held without difficulty, and the assemblability is good.

Even when the fastener 11 is driven, since the width DW1 of the lower slit 23a is great, the fastener 11 can be smoothly removed from the connection band 20.

Meanwhile, as illustrated in FIG. 3A, feeding holes 21a are formed in the band-shaped portion 21 of the connection band 20 at the same intervals as those at which the fasteners 11 are held. The feeding holes 21a are intended for use of the feed mechanism of the driving tool. That is, the feed mechanism is operated with feed claws thereof engaged with the feeding holes 21a, and thereby the fasteners 11 are configured to be fed to the injection path 40 in turn. A width of the band-shaped portion 21 having these feeding holes 21a (a length H1 of the band-shaped portion 21 when viewed in an axial direction of the fastener 11) (see FIG. 2A) is regulated by the driving tool, and cannot be easily changed. For example, when the length H1 of the band-shaped portion 21 is reduced, the feed mechanism cannot normally perform the feed operation. Therefore, the length H1 of the band-shaped portion 21 cannot be changed. However, a structure of the related art has a problem that, since the length H1 of the band-shaped portion 21 cannot be reduced, short fasteners 11 cannot be held by the connection band 20.

For example, in the present embodiment, as illustrated in FIG. 2A, when viewed in the axial direction of the fastener 11, a length H2 of the shank 14 of the fastener 11 is configured to be shorter than the length H1 of the band-shaped portion 21 of the connection band 20.

Figure 2B:
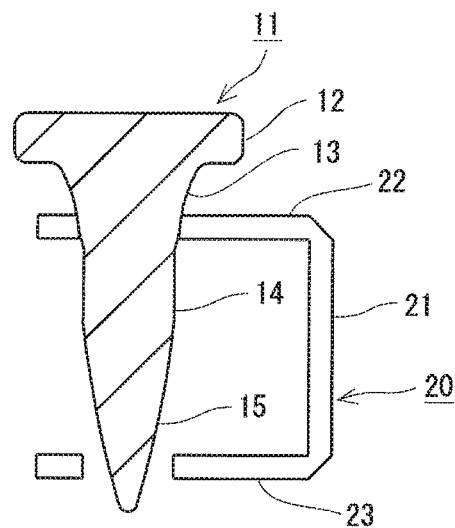
FIG. 2B is a sectional view of a conventional connection fastener.

For this reason, the lower holding portion 23 is located at a position at which it overlaps the leading end portion 15 of the fastener 11. When this short fastener 11 is to be held in the structure of the related art, there is a possibility of the lower holding portion 23 falling out of the leading end portion 15 of the fastener 11 as illustrated in FIG. 2B, and the fastener 11 cannot be reliably held. In this regard, according to the present embodiment, since the cylindrical member 30 is attached to the fastener 11, and since the lower holding portion 23 supports and holds the cylindrical member 30, the upper and lower portions of the fastener 11 can be reliably held. Therefore, the short fastener 11 limited by specifications of the tool so far can be used, and buckling during driving can be prevented because the driving posture of the fastener 11 is stable.

Figure 5A:
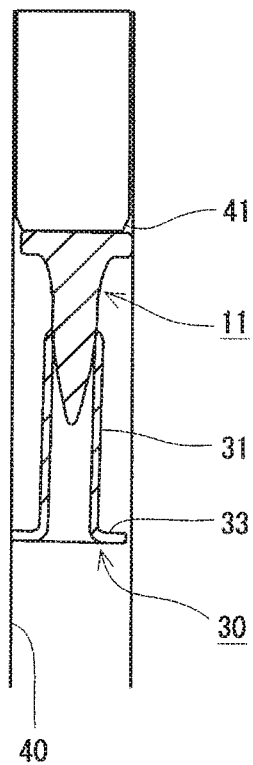
Figure 5B:
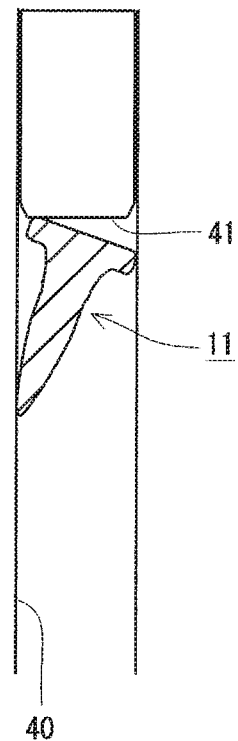
Figures 6A, 6B, 6C, 6D:
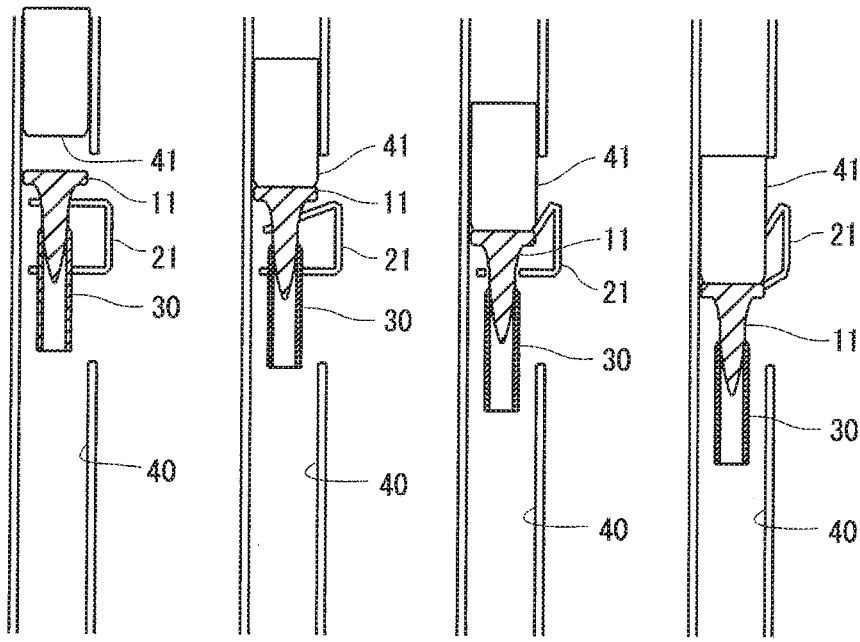

In the present embodiment, as illustrated in FIG. 5A, when the fastener 11 is driven by the driver 41 within the injection path 40 of the driving tool, the fastener 11 moves within the injection path 40 with the cylindrical member 30 attached to a toe of the fastener 11. For this reason, a tilt of the fastener 11 is suppressed. When the cylindrical member 30 is not present, the fastener 11 is inclined within the injection path 40 and is obliquely driven as illustrated in FIG. 5B, which is attributed to the buckling or the like of the fastener 11. In this way, as the cylindrical member 30 is attached to the toe (the leading end portion 15 side) of the fastener 11, the connection fastener 10 according to the present embodiment is configured to be able to prevent the buckling during driving.

In the present embodiment, since the cylindrical member 30 is provided separately from and independently of the connection band 20, there is no need to sever the cylindrical member 30 from the connection band 20 during driving of the fastener 11. For this reason, when the fastener 11 is driven by the driver 41 within the injection path 40 of the driving tool, the cylindrical member 30 is removed from the connection band 20 as illustrated in FIGS. 6A to 6D, but the cylindrical member 30 is not pulled and inclined by the connection band 20. Therefore, the fastener 11 can be prevented from being inclined and buckled. Energy is not lost in order to cut the connection band 20.

Figures 7A, 7B, 7C:
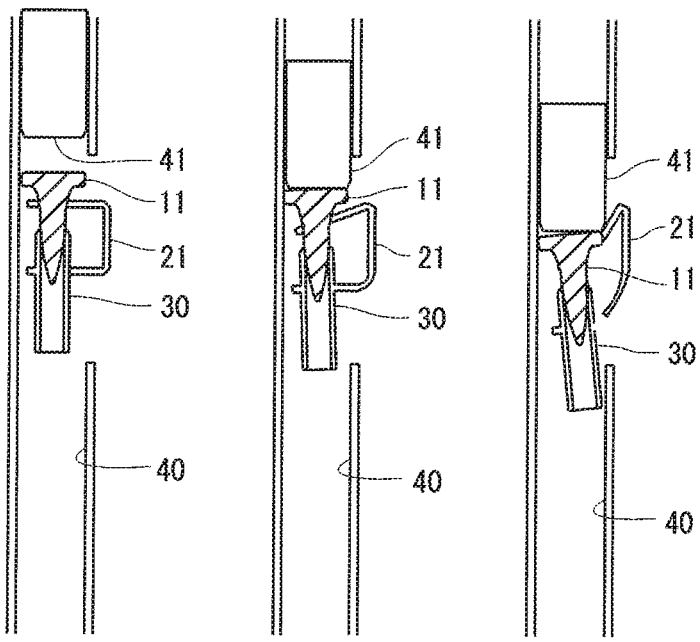

When the cylindrical member 30 is provided as a part of the connection band 20, the cylindrical member 30 is pulled by the connection band 20 when severed from the connection band 20 as illustrated in FIGS. 7A to 7C, so that the cylindrical member 30 is inclined. For this reason, there is a possibility of the fastener 11 being inclined and buckled. The loss of energy to cut the connection band 20 is caused. In this regard, when the connection band 20 and the cylindrical member 30 are separately provided as in the present embodiment, this problem does not occur.

Figure 8A:
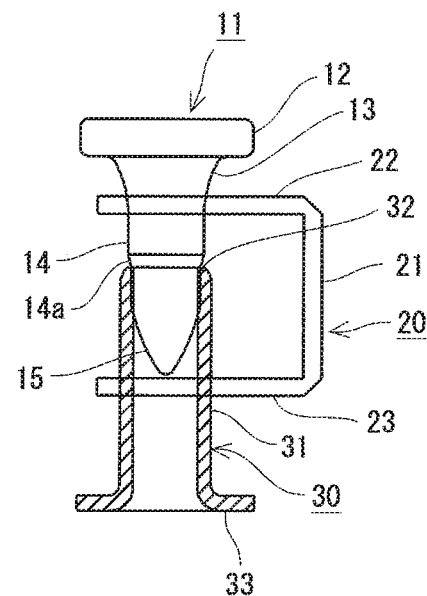

In the above embodiment, the example in which the lower holding portion 23 supports and holds the cylindrical member 30 at a position at which it overlaps the leading end portion 15 of the fastener 11 when viewed from a side direction of the fastener 11 has been described. In other words, the lower holding portion 23 supports and holds the cylindrical member 30 at a position at which the tapered leading end portion 15 of the fasteners 11 reaches the lower holding portion 23 in the axial direction of the fasteners 11. But, the embodiment is not limited thereto. As illustrated in FIG. 8A, the lower holding portion 23 may be configured to support and hold the cylindrical member 30 at a position at which it does not overlap the fastener 11 when viewed from a side direction of the fastener 11. In other words, the lower holding portion 23 supports and holds the cylindrical member 30 at a position at which the tapered leading end portion 15 of the fasteners 11 does not reach the lower holding portion 23 in the axial direction of the fasteners 11. Even when the very short fastener 11 is used in this way, the fastener 11 is lengthened by the cylindrical member 30, and thereby the fastener 11 can be stably held.

Figure 8B:
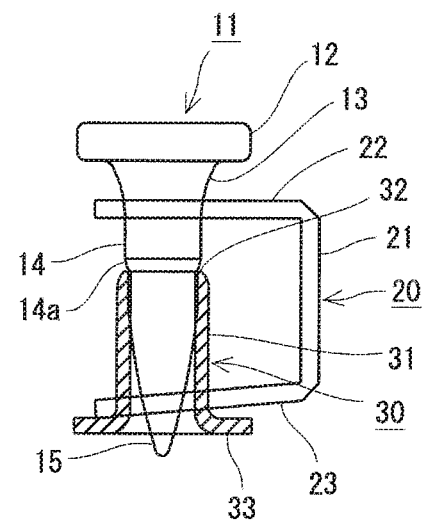

As illustrated in FIG. 8B, the flange portion 33 of the cylindrical member 30 may be disposed to make it possible to come into contact with a lower portion of the lower holding portion 23. Thereby, since spreading of the lower holding portion 23 can be suppressed by the flange portion 33, the lower holding portion 23 can be prevented from being removed from the cylindrical member 30.

Figure 9A:
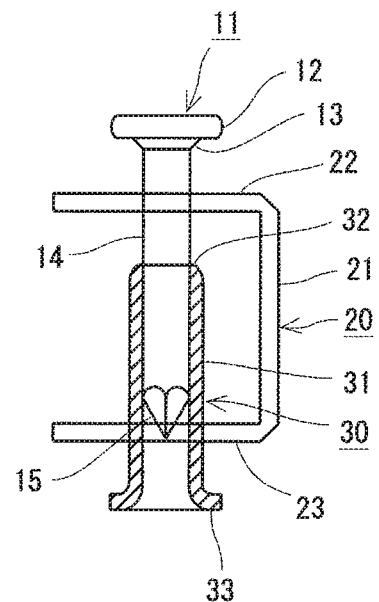
Figure 9B:
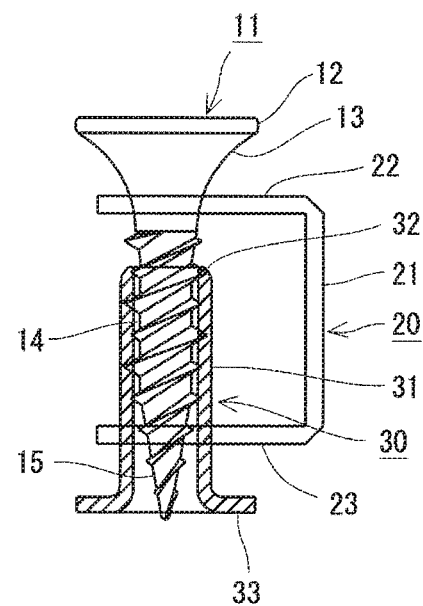

In the above embodiment, the concrete pin has been described as the fastener 11 by way of example, but the embodiment is not limited thereto. For example, as illustrated in FIG. 9A, a nail may be used as the fastener 11. In addition, as illustrated in FIG. 9B, a screw may be used as the fastener 11.

Figure 10A:
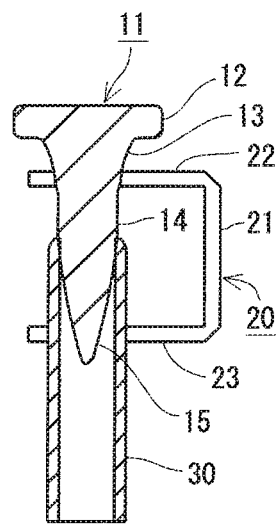
Figure 10B:
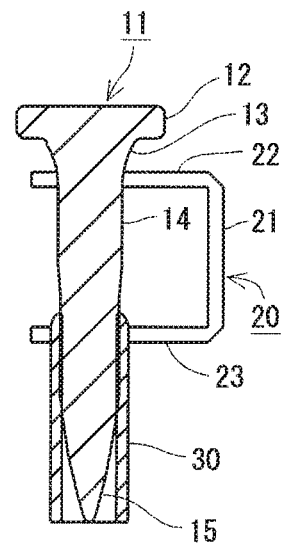
Figure 10C:
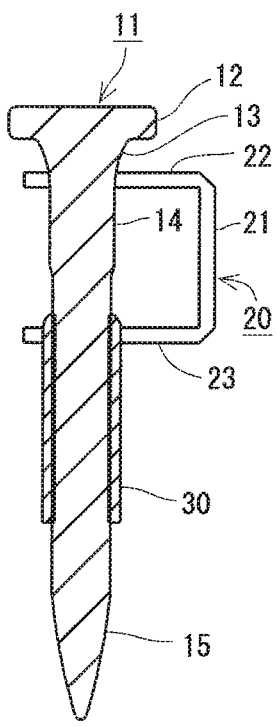

In the above embodiment, the flange portion 33 is provided for the cylindrical member 30, but the embodiment is not limited thereto. As illustrated in FIG. 10A, the flange portion 33 may not be provided for the cylindrical member 30. In addition, as illustrated in FIGS. 10B and 10C, a long fastener 11 may be used.

As illustrated in FIGS. 11A to 11E, a fall-preventing shape for preventing the lower holding portion 23 from falling off may be provided for the cylindrical member 30.

Figure 11A:
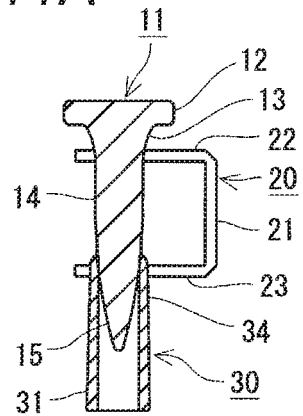

For example, as illustrated in FIG. 11A, the tubular portion 31 of the cylindrical member 30 has a tapered shape 34 whose diameter is gradually increased in a direction of a leading end portion thereof, and the tapered shape 34 is held by the lower holding portion 23. Thereby, a fall-preventing shape for preventing the lower holding portion 23 from falling off may be formed. In this configuration, besides being able to preventing the lower holding portion 23 from falling off, when the fastener 11 is loaded on the connection band 20, an inserted position of the lower holding portion 23 of the connection band 20 can depend on the tapered shape 34, and thus the assemblability can be improved. When the fastener 11 is driven, the cylindrical member 30 of the tapered shape 34 falls off from the lower holding portion 23 as it is, and thus the fastener 11 can be smoothly removed from the connection band 20.

Figure 11B:
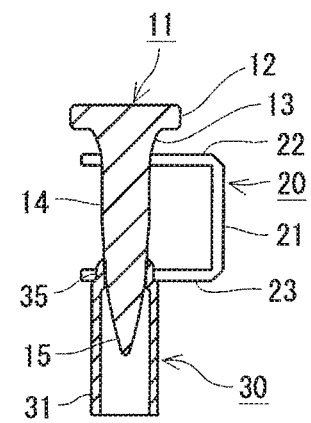

As illustrated in FIG. 11B, a stepped shape 35 having a large diameter is formed at a leading end portion side of the tubular portion 31 of the cylindrical member 30, and the lower holding portion 23 is engaged with this stepped shape 35. Thereby, the tubular portion 31 of the cylindrical member 30 may be formed in the fall-preventing shape for preventing the lower holding portion 23 from falling off. In this configuration, besides being able to preventing the lower holding portion 23 from falling off, when the fastener 11 is loaded on the connection band 20, the inserted position of the lower holding portion 23 of the connection band 20 can depend on the stepped shape 35, and thus the assemblability can be improved.

Figure 11C:
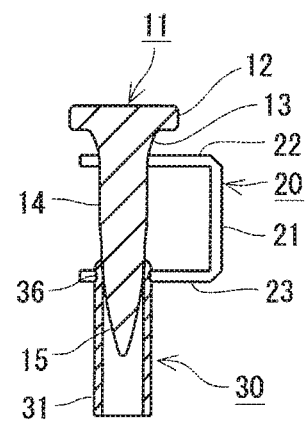

As illustrated in FIG. 11C, a concave shape 36 is formed at the tubular portion 31 of the cylindrical member 30 in a circumferential groove shape, and the lower holding portion 23 is engaged with this concave shape 36. Thereby, the tubular portion 31 of the cylindrical member 30 may be formed in the fall-preventing shape for preventing the lower holding portion 23 from falling off. In this configuration, besides being able to preventing the lower holding portion 23 from falling off, when the fastener 11 is loaded on the connection band 20, the inserted position of the lower holding portion 23 of the connection band 20 can depend on the concave shape 36, and thus the assemblability can be improved.

Figure 11D:
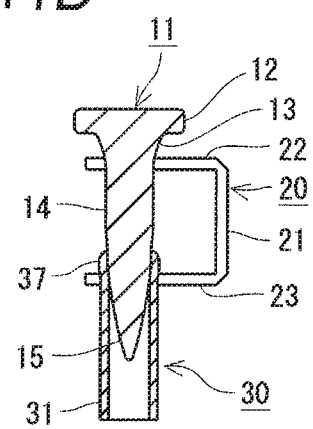

As illustrated in FIG. 11D, a bulgy shape 37 swollen in an outer circumferential direction is provided at the leading end portion side of the tubular portion 31 of the cylindrical member 30, and the lower holding portion 23 is engaged with this bulgy shape 37. Thereby, the tubular portion 31 of the cylindrical member 30 may be formed in the fall-preventing shape for preventing the lower holding portion 23 from falling off. In this configuration, besides being able to preventing the lower holding portion 23 from falling off, when the fastener 11 is loaded on the connection band 20, the inserted position of the lower holding portion 23 of the connection band 20 can depend on the bulgy shape 37, and thus the assemblability can be improved.

Figure 11E:
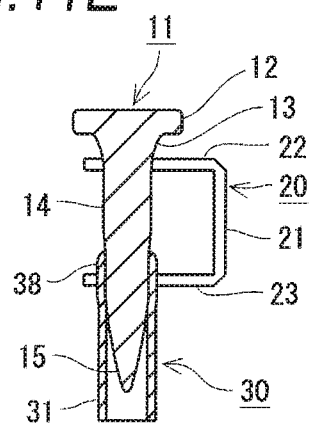

As illustrated in FIG. 11E, a large diameter shape 38 is formed by making a large diameter for the leading end portion side of the tubular portion 31 of the cylindrical member 30, and the large diameter shape 38 is held by the lower holding portion 23. Thereby, the tubular portion 31 of the cylindrical member 30 may be formed in the fall-preventing shape for preventing the lower holding portion 23 from falling off. In this configuration, besides being able to preventing the lower holding portion 23 from falling off, when the fastener 11 is loaded on the connection band 20, the inserted position of the lower holding portion 23 of the connection band 20 can depend on the large diameter shape 38, and thus the assemblability can be improved.

Figure 12A:
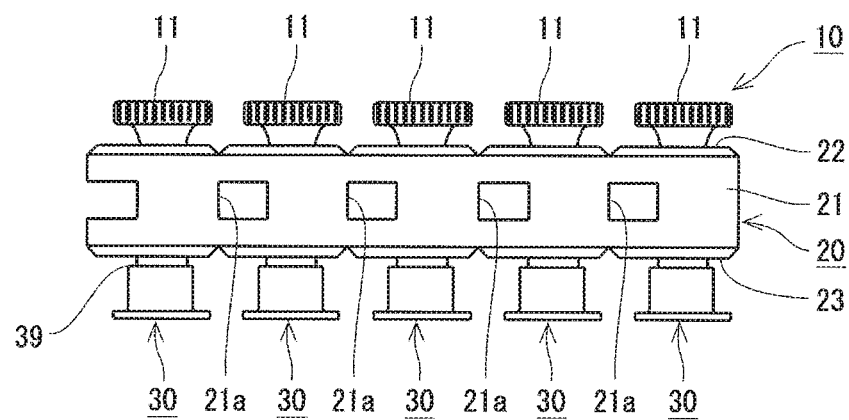
Figure 12B:
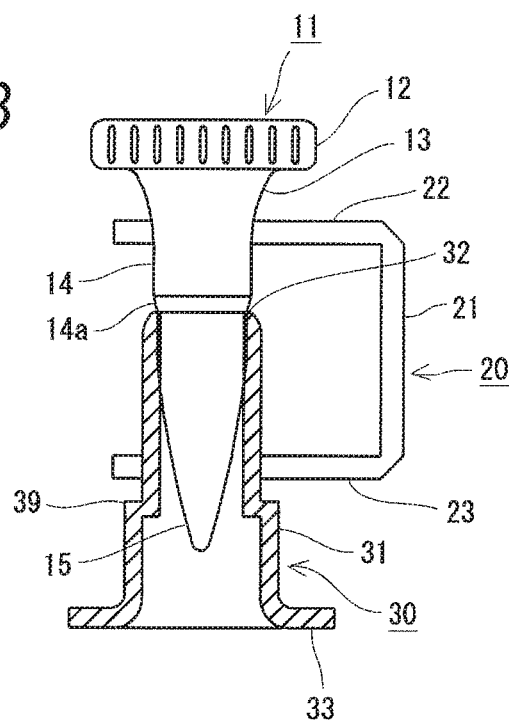

As illustrated in FIGS. 12A and 12B, a stepped portion 39 may be provided at the tubular portion 31 of the cylindrical member 30. By providing this stepped portion 39, a leading end portion side of the stepped portion 39 is formed to be larger in diameter than a trailing end portion side of the stepped portion 39. This stepped portion 39 is disposed closer to the toe side (the leading end portion 15 side) of the fastener 11 than the lower holding portion 23, and is configured not to be contact with the lower holding portion 23. Even in this configuration, as in the form shown in FIG. 11B, the lower holding portion 23 can be inhibited from being spread by the stepped portion 39, and the tubular portion 31 of the cylindrical member 30 can be formed in the fall-preventing shape for preventing the lower holding portion 23 from falling off.

In the example shown in FIGS. 12A and 12B, the stepped portion 39 is formed by corners whose cross sections are formed at a right angle. In this way, the corners of the stepped portion 39 are formed at a right angle, and thereby the lower holding portion 23 is easily caught, and thus an effect of preventing the spread of the lower holding portion 23 can be enhanced. However, the corners of the stepped portion 39 are not limited to the right angle, and may have an R shape as small as possible.

As described above, according to the present embodiment, the connection band 20 including the cylindrical member 30 attached to the fastener 11 is provided with the upper holding portions 22, each of which supports and holds the head portion 12 side of the fastener 11, and the lower holding portions 23, each of which supports and holds the cylindrical member 30 attached to the fastener 11. According to this configuration, since the fasteners 11 are stretched by the cylindrical members 30 and are held by the lower holding portions 23, even when the width of the connection band 20 is regulated by the tool, the fasteners 11 can be stably supported regardless of the lengths of the fasteners 11.

Since the cylindrical members 30 are members which are separate from and are independent of the connection band 20, the cylindrical members 30 are not pulled and inclined by the connection band 20 when removed from the connection band 20. Therefore, the fasteners 11 can be prevented from being inclined and buckled. No energy is lost to cut the connection band 20.

The cylindrical member 30 that is more easily stabilized in dimensional precision than the fastener 11 formed of a metal is used. Thereby, dimensions of the cylindrical member 30 and dimensions of the lower holding portion 23 can be made compatible with each other, and a holding force of the fastener 11 held via the cylindrical member 30 by the lower holding portion 23 can be enhanced.

The cylindrical member 30 is attached to the fastener 11, and thereby the diameter of the toe side (the leading end portion 15 side) of the fastener 11 is increased. For this reason, the fastener 11 is prevented from falling within the injection path 40 during driving. Therefore, it is possible to stabilize the driving posture of the fastener 11 to prevent the buckling.

The diameter of the lower holding hole 23b holding the cylindrical member 30 provided at the lower holding portion 23 is larger than that of the upper holding hole 22b holding the head portion 12 side of the fastener 11 provided at the upper holding portion 22. According to this configuration, the shank 14 of the fastener 11 is held by the upper holding hole 22b having a relatively small diameter, and the cylindrical member 30 is held by the lower holding hole 23b having a relatively large diameter. Thus, the fastener 11 can be tightly held even at the lower portion thickened by the amount of attaching the cylindrical member 30.

The lower holding portion 23 supports and holds the cylindrical member 30 at a position at which it overlaps the tapered leading end portion 15 of the fastener 11 or at a position at which it does not overlap the fastener 11. According to this configuration, even in the short fastener 11 located at the position at which the lower holding portion 23 overlaps the leading end portion 15 of the fastener 11 or at the position at which the lower holding portion 23 does not overlap the fastener 11, this short fastener 11 is stretched by the cylindrical member 30, and is held by the lower holding portion 23. Thus, the fastener 11 can be stably held.

When viewed in the axial direction of the fastener 11, the length H2 of the shank 14 is shorter than the length H1 of the band-shaped portion 21. According to this configuration, even in the short fastener 11 in which the length H2 of the shank 14 is shorter than the length H1 of the band-shaped portion 21, this short fastener 11 is stretched by the cylindrical member 30, and is held by the lower holding portion 23. Thus, the fastener 11 can be stably held.

The cylindrical member 30 includes the flange portion 33 that faces the lower portion of the lower holding portion 23 and is formed to protrude in a radial direction of the outer circumference of the cylindrical member 30. According to this configuration, since the lower holding portion 23 is prevented from falling off by the flange portion 33, the lower holding portion 23 is prevented from being removed from the cylindrical member 30.

The flange portion 33 is provided, and thereby the diameter of the toe side of the fastener 11 is increased. Thus, an effect of preventing the fastener 11 from falling within the injection path 40 during driving can be enhanced. Therefore, it is possible to stabilize the driving posture of the fastener 11 to prevent the buckling.

The fastener 11 includes the stepped portion 14a at the shank 14, and the stepped portion 14a is formed such that the outer diameter thereof close to the leading end portion 15 is smaller than that close to the head portion 12, and faces the upper edge portion 32 of the cylindrical member 30. According to this configuration, when the cylindrical member 30 is attached to the fastener 11, the position of the cylindrical member 30 depends on the stepped portion 14a, and thus a problem that the attached position of the cylindrical member 30 to the fastener 11 is made too shallow or too deep can be avoided.

The cylindrical member 30 includes the fall-preventing shape for preventing the lower holding portion 23 from falling off. According to this configuration, since the lower holding portion 23 is prevented from falling off by the fall-preventing shape, the lower holding portion 23 is prevented from being removed from the cylindrical member 30.

When the fall-preventing shape is provided for the fastener 11, there is a problem that the penetration resistance of the fastener 11 is increased or that the fastener 11 is easily buckled. However, the fall-preventing shape is provided for the cylindrical member 30, and thereby such a problem does not occur.

(1) A connection fastener includes:
  a plurality of fasteners each of which includes a head portion provided at one end portion side and a tapered leading end portion provided at the other end portion side;
  a sheet-shaped connection portion that is configured to connect the plurality of fasteners in a parallel direction; and
  attaching portions that are separate from the connection portion attached to the fasteners such that each attaching portion covers at least one part of each leading end portion,
    wherein the connection portion includes:
    first holding portions each of which is configured to support a head portion side of each fastener; and
    second holding portions each of which is configured to support at least one part of a circumferential surface of each attaching portion.
(2) The connection fastener according to (1), wherein:
  the connection portion includes second holding holes which support the attaching portions provided at the second holding portions, and first holding holes which support the head portion sides of the fasteners provided at the first holding portions; and
  diameters of the second holding holes are larger than diameters of the first holding holes.
(3) The connection fastener according to (1) or (2), wherein:
  the connection portion includes second holding holes which support the attaching portions provided at the second holding portions, and first holding holes which support the head portion sides of the fasteners provided at the first holding portions; and
  opening widths of opening slits of the second holding holes are larger than opening widths of opening slits of the first holding holes.
(4) The connection fastener according to any one of (1) to (3), wherein:
  each of the fasteners includes a shank continuously provided between the head portion and the leading end portion; and
  the second holding portions support the attaching portions at positions at which the second holding portions overlap the tapered leading end portions of the fasteners or at positions at which the second holding portions do not overlap the fasteners, when viewed from a side direction of the fastener.
(5) The connection fastener according to any one of (1) to (4), wherein:
  the connection portion is formed by bending one long sheet in a C shape;
  the first holding portions, the second holding portions, and a band-shaped portion connecting the first holding portions and the second holding portions are formed on the same plane in the long sheet;
  each of the fasteners includes a shank continuously provided between the head portion and the leading end portion; and
  in an axial direction of the fastener, a length of the shank is shorter than a length of the band-shaped portion.
(6) The connection fastener according to (5), wherein:
  each fastener includes a stepped portion at the shank; and
  the stepped portion is formed such that an outer diameter of a leading end portion side is smaller than an outer diameter of the head portion side, and faces an upper edge portion of the attaching portion.
(7) The connection fastener according to any one of (1) to (6), wherein
  each of the attaching portions includes a flange portion protruding in an outer circumferential direction below the second holding portion.
(8) The connection fastener according to any one of (1) to (7), wherein
  each of the attaching portions includes a fall-preventing shape for preventing the second holding portion from falling off.
(9) The connection fastener according to (8), wherein the fall-preventing shape is a tapered shape which diameter is gradually increased toward a leading end portion side of the fastener.
(10) The connection fastener according to (8), wherein the fall-preventing shape is a stepped shape formed by making a large diameter of the attaching portion in a leading end portion side of the fastener or a concave shape of a circumferential groove shape.
(11) The connection fastener according to (8), wherein the fall-preventing shape is a bulgy shape in which the attaching portion in the head side of the fastener is swollen in an outer circumferential direction or a large diameter shape formed by making a large diameter of the attaching portion in the head side of the fastener.

What is claimed is:

1. A connection fastener comprising:
   a plurality of fasteners each of which includes a head portion provided at one end portion side and a tapered leading end portion provided at the other end portion side;
   a sheet-shaped connection portion that is configured to connect the plurality of fasteners in a parallel direction; and
   attaching portions that are separate from the connection portion and into which the fasteners are inserted such that each attaching portion covers at least one part of each leading end portion to of each of the plurality of fasteners,
   wherein the connection portion includes:
   first holding portions each of which is configured to support a head portion side of each fastener; and
   second holding portions each of which is configured to support at least one part of a circumferential surface of each attaching portion.

2. The connection fastener according to claim 1, wherein:
   the connection portion includes second holding holes which support the attaching portions provided at the second holding portions, and first holding holes which support the head portion sides of the fasteners provided at the first holding portions.

3. The connection fastener according to claim 2, wherein:
   diameters of the second holding holes are larger than diameters of the first holding holes.

4. The connection fastener according to claim 2, wherein:
   opening widths of opening slits of the second holding holes are larger than opening widths of opening slits of the first holding holes.

5. The connection fastener according to claim 1, wherein:
   each of the fasteners includes a shank continuously provided between the head portion and the leading end portion; and
   the second holding portions support the attaching portions at positions at which the second holding portions overlap the tapered leading end portions of the fasteners, when viewed from a side direction of the fastener.

6. The connection fastener according to claim 1, wherein:
   each of the fasteners includes a shank continuously provided between the head portion and the leading end portion; and
   the second holding portions support the attaching portions at positions at which the second holding portions do not overlap the fasteners, when viewed from a side direction of the fastener.

7. The connection fastener according to claim 1, wherein:
   the connection portion is formed by bending one long sheet in a C shape;
   the first holding portions, the second holding portions, and a band-shaped portion connecting the first holding portions and the second holding portions are formed on the same plane in the long sheet;
   each of the fasteners includes a shank continuously provided between the head portion and the leading end portion; and
   in an axial direction of the fastener, a length of the shank is shorter than a length of the band-shaped portion.

8. The connection fastener according to claim 7, wherein:
   each fastener includes a stepped portion at the shank; and the stepped portion is formed such that an outer diameter of a leading end portion side is smaller than an outer diameter of the head portion side, and faces an upper edge portion of the attaching portion.

9. The connection fastener according to claim 1, wherein each of the attaching portions includes a fall-preventing shape for preventing the second holding portion from falling off.

10. The connection fastener according to claim 9, wherein the fall-preventing shape is a tapered shape which diameter is gradually increased toward a leading end portion side of the fastener.

11. The connection fastener according to claim 9, wherein the fall-preventing shape is a stepped shape formed by making a large diameter of the attaching portion in a leading end portion side of the fastener or a concave shape of a circumferential groove shape.

12. The connection fastener according to claim 9, wherein the fall-preventing shape is a bulgy shape in which the attaching portion in the head side of the fastener is swollen in an outer circumferential direction or a large diameter shape formed by making a large diameter of the attaching portion in the head side of the fastener.

13. The connection fastener according to claim 1, wherein each of the fasteners further include an under-head tapered portion under the head portion of each fastener and between the head portion and the tapered leading end portion; and
   wherein at least part of the under-head tapered portion is exposed without being covered by the attaching portion.

14. The connection fastener according to claim 1, wherein a leading end of each attaching portion extends beyond the tapered leading end portion of each fastener and an opening is provided at the leading end of each attaching portion.

15. The connection fastener according to claim 1, wherein at the tapered leading end portion of each fastener a space is provided between an outer surface of the tapered leading end portion and an inner surface of each attaching portion.

16. A connection fastener comprising:
   a plurality of fasteners each of which includes a head portion provided at one end portion side and a tapered leading end portion provided at the other end portion side;
   a sheet-shaped connection portion that is configured to connect the plurality of fasteners in a parallel direction; and
   attaching portions that are separate from the connection portion attached to the fasteners such that each attaching portion covers at least one part of each leading end portion and that are assembled to the plurality of fasteners,
   wherein the connection portion includes:
   first holding portions each of which is configured to support a head portion side of each fastener;
   second holding portions each of which is configured to support at least one part of a circumferential surface of each attaching portion; and
   each of the attaching portions includes a flange portion protruding in an outer circumferential direction below the second holding portion.

17. A connection fastener comprising:
   a plurality of fasteners each of which includes a head portion provided at one end portion side and a tapered leading end portion provided at the other end portion side;

a sheet-shaped connection portion that is configured to connect the plurality of fasteners in a parallel direction; and attaching portions that are separate from the connection portion attached to the fasteners such that each attaching portion covers at least one part of each leading end portion and that are assembled to the plurality of fasteners, wherein the connection portion includes:

first holding portions each of which is configured to support a head portion side of each fastener; and second holding portions each of which is configured to support at least one part of a circumferential surface of each attaching portion;

wherein each of the attaching portions includes a fall-preventing shape for preventing the second holding portion from falling off, and wherein the fall-preventing shape comprises at least one of:

a tapered shape which diameter is gradually increased toward a leading end portion side of the fastener; or a stepped shape formed by making a large diameter of the attaching portion in a leading end portion side of the fastener or a concave shape of a circumferential groove shape; or a bulgy shape in which the attaching portion in the head side of the fastener is swollen in an outer circumferential direction or a large diameter shape formed by making a large diameter of the attaching portion in the head side of the fastener.

* * * * *